US008231096B2

(12) United States Patent
Lee et al.

(10) Patent No.: US 8,231,096 B2
(45) Date of Patent: Jul. 31, 2012

(54) TELESCOPIC TUBE SET FOR BRIDGE TRANSPORT SYSTEM

(75) Inventors: Hyo Jik Lee, Daejeon (KR); Byung Suk Park, Daejeon (KR); Jong Kwang Lee, Daejeon (KR); Ki Ho Kim, Daejeon (KR)

(73) Assignees: Korea Atomic Energy Research Institute (KR); Korea Hydro & Nuclear Power Co., Ltd (KR)

( * ) Notice: Subject to any disclaimer, the term of this patent is extended or adjusted under 35 U.S.C. 154(b) by 5 days.

(21) Appl. No.: 13/017,524

(22) Filed: Jan. 31, 2011

(65) Prior Publication Data

US 2011/0240817 A1 Oct. 6, 2011

(30) Foreign Application Priority Data

Mar. 30, 2010 (KR) ........................ 10-2010-0028808

(51) Int. Cl.
*A47H 1/10* (2006.01)

(52) U.S. Cl. .......................... 248/333; 248/326; 248/327

(58) Field of Classification Search .................... 248/33, 248/334.1, 335, 336, 337, 327, 326, 332; 378/194

See application file for complete search history.

(56) References Cited

U.S. PATENT DOCUMENTS

| 2,835,520 | A | * | 5/1958 | Schiring et al. | 403/63 |
| 3,118,066 | A | * | 1/1964 | Thomas et al. | 378/194 |
| 3,776,500 | A | * | 12/1973 | Foderaro | 248/333 |
| 3,887,155 | A | * | 6/1975 | Bertalot | 248/333 |
| 4,057,891 | A | * | 11/1977 | Amor et al. | 29/434 |
| 4,677,273 | A | * | 6/1987 | Colegrove et al. | 219/121.13 |
| 5,240,218 | A | * | 8/1993 | Dye | 248/330.1 |

OTHER PUBLICATIONS

Kwang Ho Yoon et al., "Design of Bridge Transport System with Equal Incremental Telescopic Motion," KSME A, vol. 34, No. 2, Feb. 1, 2010, pp. 227-235.

* cited by examiner

*Primary Examiner* — Anita M King
(74) *Attorney, Agent, or Firm* — Cantor Colburn LLP

(57) ABSTRACT

A telescopic tube set for a bridge transport system is disclosed. The telescopic tube set includes cylindrical tubes each having an upper end, at which an upper ring is mounted, and a lower end, at which a lower ring is mounted, the cylindrical tubes having different diameters, pulleys mounted to respective inner wall surfaces of a part of the tubes, and extension/retraction lines each having an end connected to the upper ring of a corresponding one of the tubes, and an opposite end connected to the upper ring of another corresponding one of the tubes while extending around the pulley mounted to the tube interposed between the corresponding tubes. A plurality of bearings are installed at the lower ring to guide the tube, at which the lower ring is mounted, such that the tube extends or retracts straight in a longitudinal direction.

10 Claims, 10 Drawing Sheets

TELESCOPIC TUBE SET FOR BRIDGE TRANSPORT SYSTEM

BACKGROUND OF THE INVENTION

1. Field of the Invention

The present invention relates to a telescopic tube set for a bridge transport system, and more particularly to a telescopic tube set for a bridge transport system capable of

2. Description of the Related Art

A bridge transport system is used to move remote handling equipment such as a servo manipulator and tools to an interior of a hot cell.

Such a bridge transport system may include main modules to move in x, y and z-directions in a hot cell, which include a girder, a trolley and a telescopic tube set, and auxiliary modules including a power and signal cable management system, remote handling equipment, a tool attachment die, hoist crane, etc.

An example of a telescopic tube moving device, which is included in the bridge transport system configured as mentioned above, is shown in FIG. 1.

As shown in FIG. 1, the telescopic tube moving device, which moves a telescopic tube set 100, includes a girder 300, a trolley 200, and a guide rail 400. The telescopic tube set 100 functions to vertically move a servo manipulator, etc., and includes a plurality of tubes having different diameters.

As shown in FIG. 1, each tube of the telescopic tube set basically has a square cross-section. A linear motion (LM) guide rail and a block are installed at one side wall surface of each tube, to uniformly guide extension and retraction of the tube.

The remaining wall surfaces of each tube, except for the wall surface, at which the LM guide and block are installed, are formed by thin covers. In this telescopic tube set, there is an advantage in that high motion accuracy and high reliability are achieved by the provision of the LM guide. However, there may be a problem of eccentricity because only the wall of each tube where the LM guide is installed is thick, whereas the remaining walls of the tube are thin, so that the center of gravity of the tube is biased to one side of the tube.

Furthermore, there may be a structural problem of poor resistance to bending and torsion because only the wall of each tube where the LM guide is installed is thick, whereas the remaining walls of the tube are thin.

Although not shown, the telescopic tube set, which includes a plurality of tubes, as mentioned above, uses a device for extending or retracting each tube of the telescopic tube set. However, the extension/retraction device is installed outside the telescopic tube set. For this reason, the extension/retraction device may be contaminated by dust, etc., so that it may malfunction upon extension or retraction of the telescopic tube set. In addition, the user or other devices may bump into the extension/retraction device, possibly resulting in injury or damage.

Moreover, such a conventional telescopic tube has a problem in that it is difficult to achieve accurate control because the extension and retraction of the telescopic tube are carried out, starting from the outermost tube and innermost tube, respectively.

SUMMARY OF THE INVENTION

The present invention has been made in view of the above mentioned problems, and an object of the invention is to provide a telescopic tube set for a bridge transport system capable of extending or retracting all tubes of the telescopic tube set by the same length during extension or retraction of the telescopic tube set.

Another object of the invention is to provide a safe and secure telescopic tube set for a bridge transport system capable of: achieving stable extension and retraction through a configuration in which each tube of the telescopic tube set has a uniform side wall thickness such that the center of gravity of the tube is centrally positioned without being biased to one side of the tube; exhibiting excellent strength against bending and torsion through a configuration in which each tube of the telescopic tube set has a cylindrical shape; and preventing malfunction of the telescopic tube set caused by contamination of extension/retraction lines connected between adjacent tubes and a tube extension/retraction device through a configuration in which the extension/retraction lines and extension/retraction device are not exposed to the outside of the telescopic tube set even when the telescopic tube set extends to a maximum length, thereby preventing a person or other equipment from being injured or damaged by the extension/retraction lines or extension/retraction device.

In accordance with one aspect, the present invention provides a telescopic tube set for a bridge transport system including cylindrical tubes each having an upper end, at which an upper ring is mounted, and a lower end, at which a lower ring is mounted, the cylindrical tubes having different diameters, pulleys mounted to respective inner wall surfaces of a part of the tubes, and extension/retraction lines each having an end connected to the upper ring of a corresponding one of the tubes, and an opposite end connected to the upper ring of another corresponding one of the tubes while extending around the pulley mounted to the tube interposed between the corresponding tubes, wherein a plurality of bearings are installed at the lower ring to guide the tube, at which the lower ring is mounted, such that the tube extends or retracts straight in a longitudinal direction.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, a telescopic tube set according to an exemplary embodiment of the present invention will be described with reference to the annexed drawings.

Figure 1:
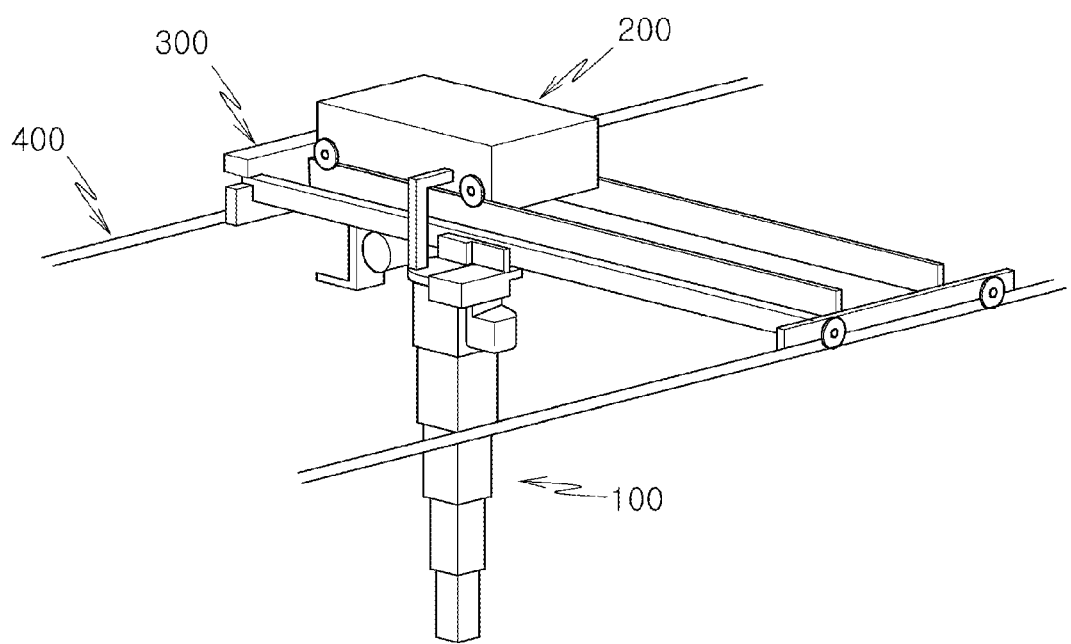
FIG. 1 is a perspective view illustrating an example of a conventional bridge transport system.
Figure 2:
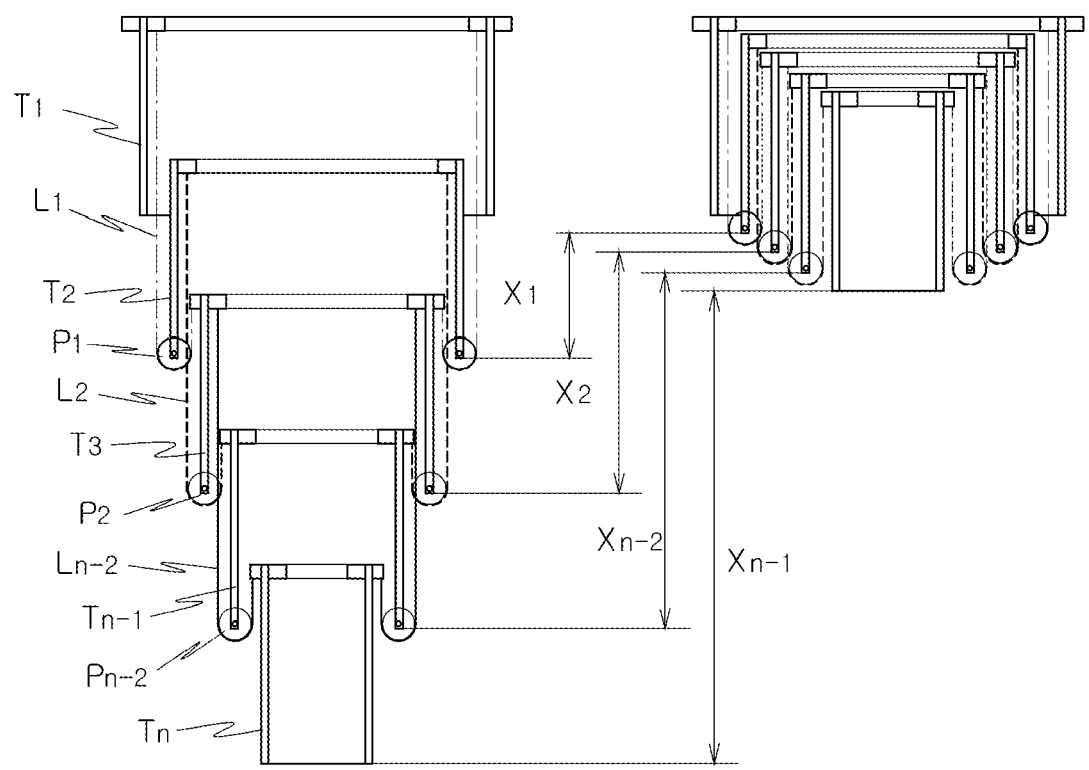
FIG. 2 is a schematic view for explaining the operation principle of a telescopic tube set constituting a bridge transport system according to an exemplary embodiment of the present invention.

Referring to FIG. 2, a telescopic tube set according to an exemplary embodiment of the present invention is illustrated. The telescopic tube set includes a plurality of cylindrical tubes $T_1$ to $T_n$, and an extension/retraction device for extending or retracting the tubes $T_1$ to $T_n$. The extension/retraction device is installed within the tubes $T_1$ to $T_n$.

In detail, the telescopic tube set according to the illustrated embodiment of the present invention includes cylindrical tubes $T_1$ to $T_n$ each having an upper end, at which an upper ring 11 is mounted, and a lower end, at which a lower ring 12 is mounted. The cylindrical tubes $T_1$ to $T_n$ have different diameters. The telescopic tube set also includes pulleys $P_1$ to $P_{n-2}$ mounted to respective inner wall surfaces of a part of the tubes $T_1$ to $T_n$, namely, the tubes $T_2$ to and extension/retraction lines $L_1$ to $L_{n-2}$ each having an end connected to the upper ring 11 of a corresponding one of the tubes $T_1$ to $T_n$, and an opposite end connected to the upper ring 11 of another corresponding one of the tubes $T_1$ to $T_n$ while extending around the pulley mounted to the tube interposed between the corresponding tubes.

That is, the pulleys $P_1$ to $P_{n-2}$ and the extension/retraction lines $L_1$ to $L_{n-2}$ constitute the extension/retraction device, which extends or retracts the tubes by the same length.

Of course, it is necessary to use a winding machine, in order to extend or retract the telescopic tube set configured as described above. That is, a pulling wire (not shown) is connected to the innermost tube $T_n$. As the pulling wire is wound or unwound, the tubes $T_1$ to $T_n$ are retracted or extended. The winding machine is used to wind or unwind the pulling wire. The winding machine may include a pulley or sprocket, on which the wire is wound, and a motor for driving the pulley or sprocket. Since such a winding machine may be identical or similar to conventional ones, no detailed description thereof will be given.

Referring to FIG. 2, the principle of the extension and retraction of the telescopic tube set is illustrated. In the illustrated case, the telescopic tube set includes 5 tubes.

That is, the outermost tube, namely, the tube $T_1$, is always fixed to a support structure. The remaining tubes $T_2$ to $T_n$ are installed to be extendable and retractable with respect to the tube $T_1$. The movement ranges of the tubes $T_2$ to $T_n$ correspond to $X_1$, $X_2$, $X_{n-2}$, and $X_{n-1}$, respectively.

Since the length of each of the extension/retraction line $L_1$ to $L_{n-2}$ is constant, this length is not varied in despite movement of the corresponding ones of the tubes $T_1$ to $T_n$.

Accordingly, when the innermost tube $T_n$ is retracted upward, portions of each line respectively disposed at left and right sides of the corresponding pulley exhibit the same length variation.

This may be expressed as follows:

$$X_1 = X_2 - X_1$$

$$X_{n-2} - X_{n-3} = X_{n-1} - X_{n-2}$$

The relative displacement of adjacent tubes $T_x$ and $T_{x-1}$ (x: 2 to n) may be derived from the above Expression, as follows:

$$X_1$$

$$X_2 - X_1 = X_1$$

$$X_{n-1} - X_{n-2} = X_1$$

That is, the relative displacements (unit strokes) of adjacent ones of the tubes $T_1$ to $T_n$ are the same. Also, the absolute displacements of adjacent ones of the tubes $T_1$ to $T_n$ are as follows:

$$X_1$$

$$X_2 = 2X_1$$

$$X_{n-2} = (n-1)X_1$$

That is, when the innermost tube $T_n$ is retracted upward or extended downward, the remaining tubes $T_1$ to $T_{n-1}$ are retracted or extended by the same length as the innermost tube $T_n$.

Hereinafter, the constituent elements for extending or retracting the tubes of the telescopic tube set by the same length, namely, the extension/retraction lines $L_1$ to $L_{n-2}$ and pulleys $P_1$ to $P_{n-2}$, and the connection relations thereof will be described in detail.

As shown in FIG. 2, the pulleys $P_1$ to $P_{n-2}$ are not installed at the outermost and innermost tubes $T_1$ and $T_n$, but is installed at the intermediate tubes $T_2$ to $T_{n-1}$, respectively. The installation positions of the pulleys $P_1$ to $P_{n-2}$ are respective lower ends of the inner wall surfaces of the tubes $T_2$ to $T_{n-1}$.

The number of the extension/retraction lines $L_1$ to $L_{n-2}$ corresponds to the number of the pulleys $P_1$ to $P_{n-2}$. An intermediate portion of each of the extension/retraction lines $L_1$ to $L_{n-2}$ extend around a corresponding one of the pulleys $P_1$ to $P_{n-2}$.

That is, each of the extension/retraction lines $L_1$ to $L_{n-2}$, namely, the extension/retraction line $L_x$ (x: 1 to n−2), is connected, at opposite ends thereof, to the upper ring 11 of a corresponding one of the tubes $T_1$ to $T_n$, namely, the tube $T_x$, and to the upper ring 11 of another corresponding one of the tubes $T_1$ to $T_n$, namely, the tube $T_{x+2}$, respectively, while extending around the pulley $P_x$ mounted to the tube $T_{x+1}$ interposed between the corresponding tubes $T_x$ and $T_{x+2}$.

Referring to FIG. 2, for example, the extension/retraction line $L_2$ is connected to the upper end of the tube $T_1$ at an end thereof, and is connected to the upper end of the tube $T_3$ at an opposite end thereof, while extending around the pulley $P_2$ mounted to the tube $T_2$.

In the case of the telescopic tube set configured in accordance with the illustrated embodiment of the present invention as described above, as shown in FIGS. 3 to 5, all the extension/retraction lines $L_1$ to $L_{n-2}$ and pulleys $P_1$ to $P_{n-2}$ are installed within the tubes. Accordingly, these constituent elements are not exposed to the outside of the telescopic tube set during extension or retraction of the tubes.

For the extension/retraction lines $L_1$ to $L_{n-2}$, various lines may be used. For example, a wire made of a plurality of twisted steel cords or a chain may be used.

Where the extension/retraction lines $L_1$ to $L_{n-2}$ are constituted by wires, the pulleys $P_1$ to $P_{n-2}$ may be constituted by pulleys each having a simple structure in which a groove is formed around a circumferential surface of the pulley. However, where the extension/retraction lines $L_1$ to $L_{n-2}$ are constituted by chains, the pulleys $P_1$ to $P_{n-2}$ are constituted by sprockets.

The tubes $T_1$ to $T_n$ constituting the telescopic tube set configured as described above have the same structure, except that they have different diameters. Accordingly, the constituent elements of the tubes will be designated by the same reference numerals, respectively, in the following description.

First, the outermost tube $T_1$ will be described. The tubes, which have different structures from the outermost tube $T_1$, will be subsequently described.

Figure 3:
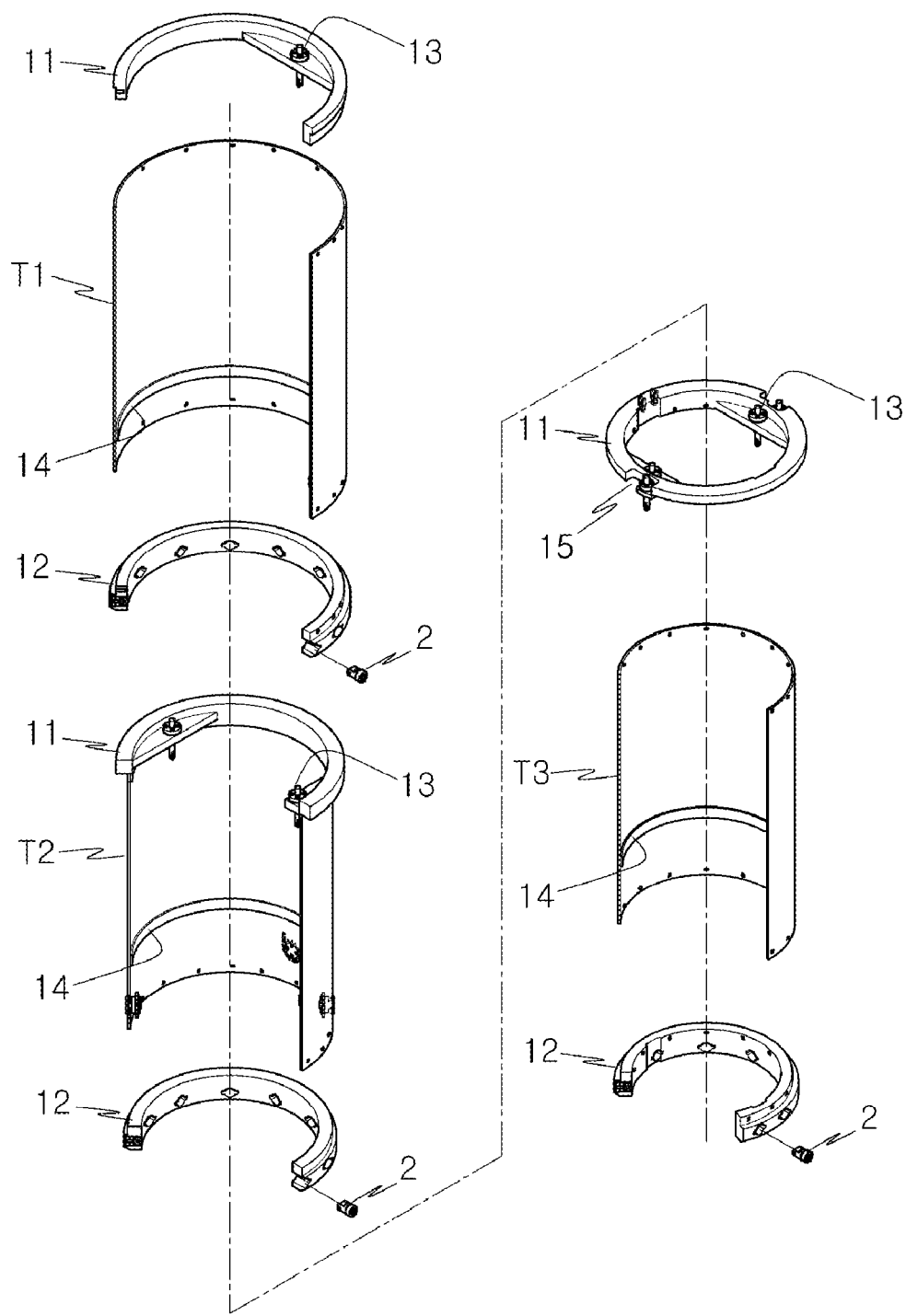
FIG. 3 is an exploded perspective view illustrating an example of the telescopic tube according to the illustrated embodiment of the present invention.

As shown in FIG. 3, one circular upper ring 11 is mounted to an upper end of the tube $T_1$, and one circular lower ring 12 is mounted to a lower end of the tube $T_1$.

The upper rings 11 are mounted to all tubes including the outermost tube $T_1$ to the innermost tube $T_n$, respectively. On the other hand, the lower rings 12 are mounted to all tubes, except for the innermost tube $T_n$.

Figure 4:
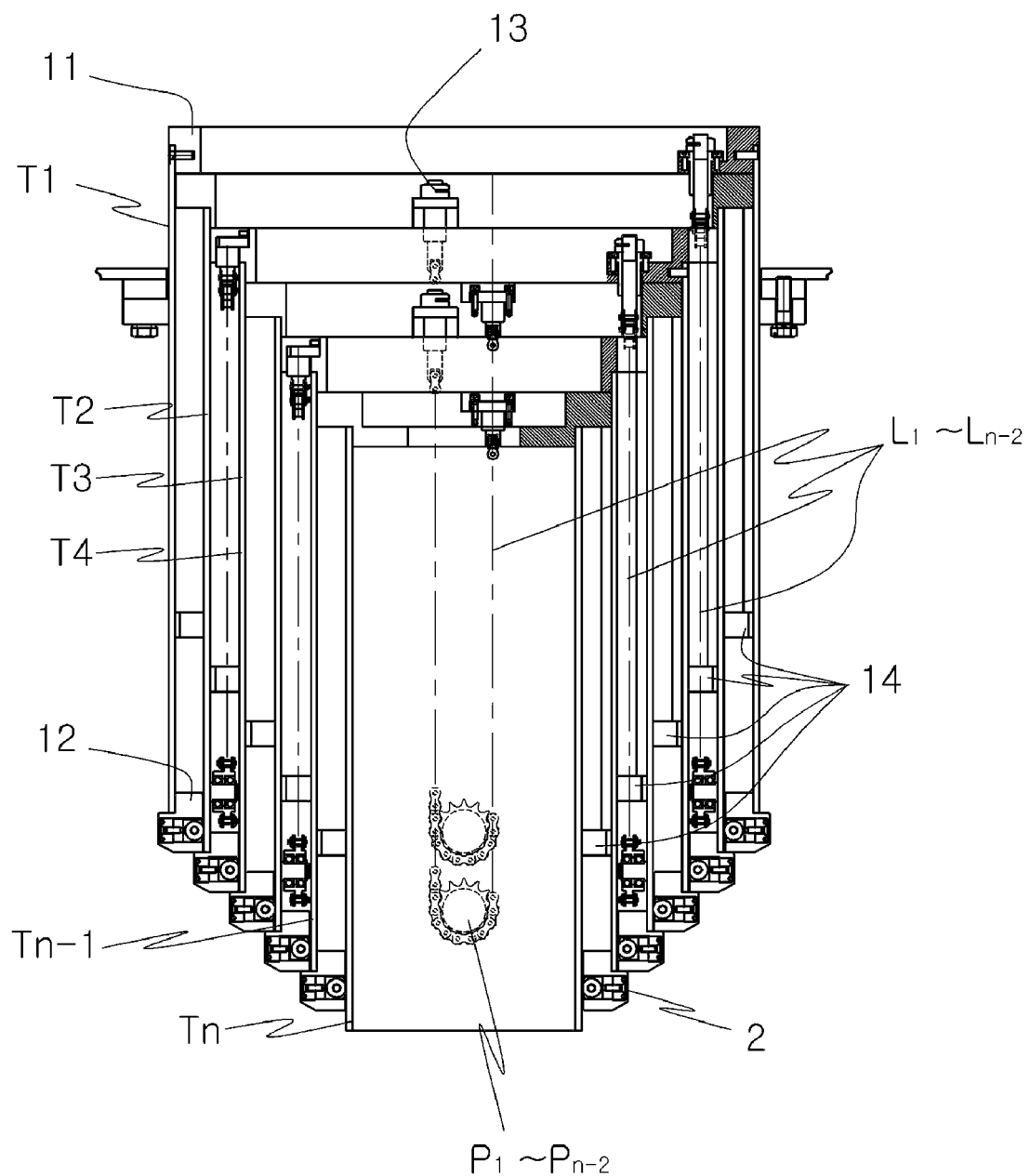
FIG. 4 is a sectional view illustrating a retracted state of another example of the telescopic tube set according to the illustrated embodiment of the present invention.
Figure 5:
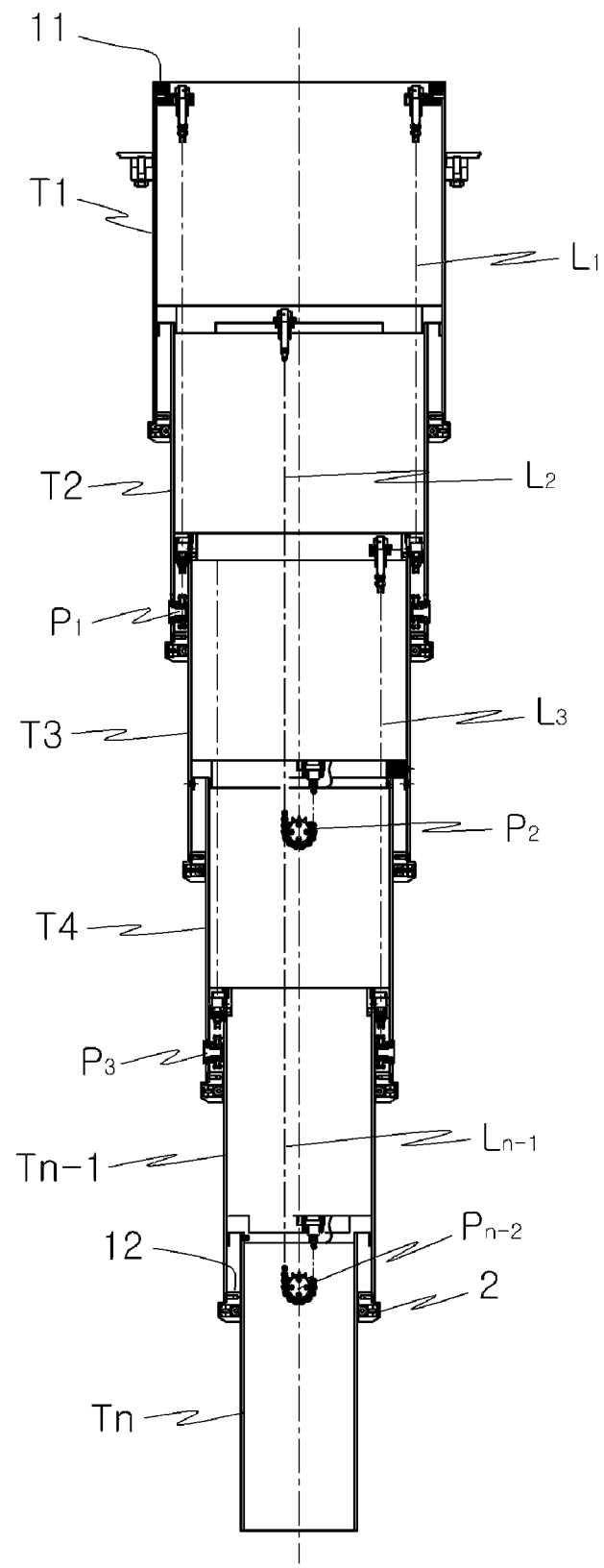
FIG. 5 is a sectional view illustrating an extended state of the telescopic tube set illustrated in FIG. 4.
Figure 6:
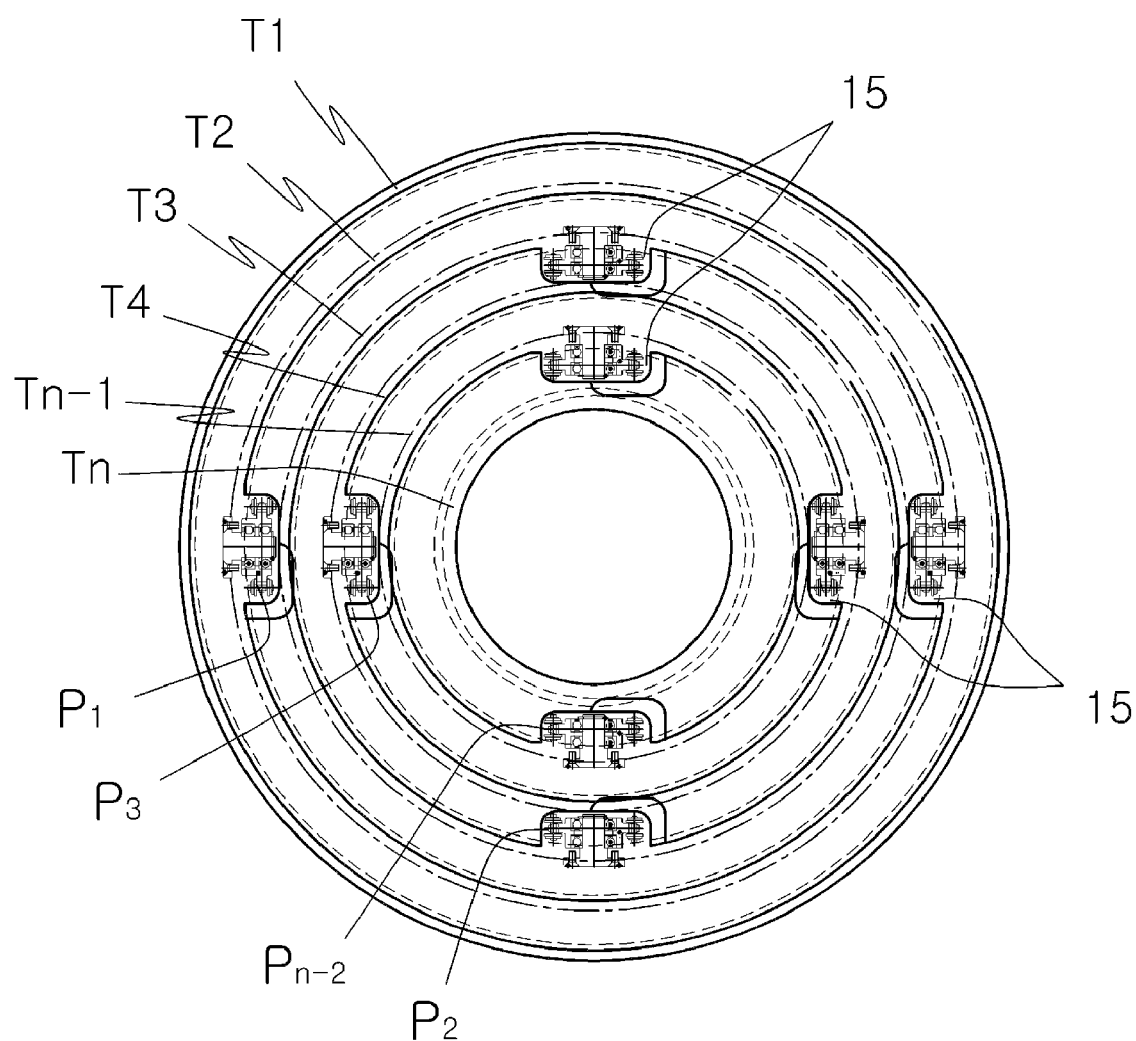
FIG. 6 is a plan view illustrating the telescopic tube set illustrated in FIG. 4.
Figure 7:
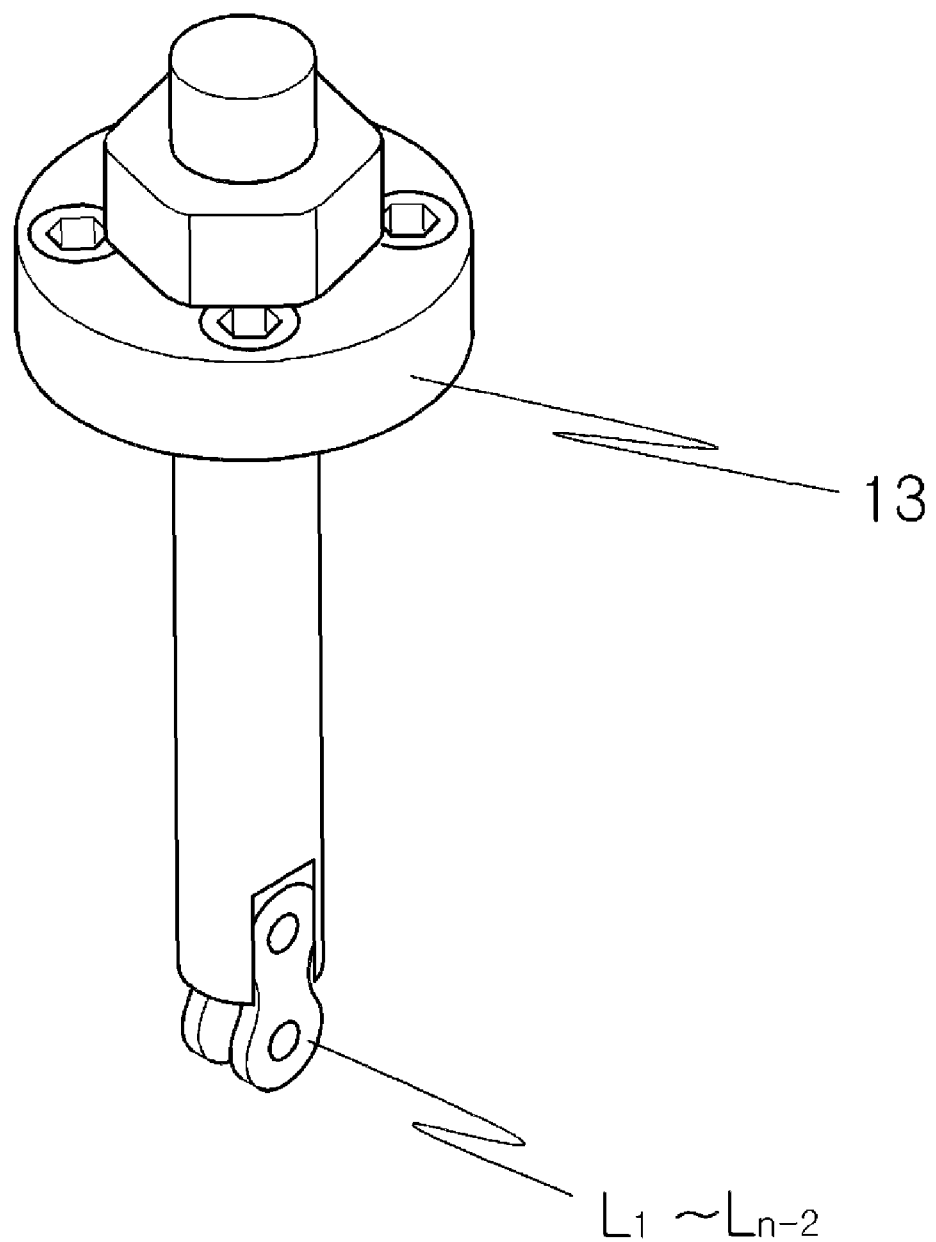
FIG. 7 is a perspective view illustrating an example of a line fastener included in the telescopic tube set according to the illustrated embodiment of the present invention.

As shown in FIGS. 3 and 4, line fasteners 13 are mounted to a lower surface of each upper ring 11 at opposite sides of the upper ring 11, respectively. For each line fastener 13, a tension bolt is used.

The reason why tension bolts are used for the line fasteners 13 is that it may be possible to easily adjust the length and tension of each extension/retraction line, and thus to make uniform relative displacement of adjacent tubes by adjusting the length of the extension/retraction lines by using tension bolts.

The line fasteners 13 installed at one of the adjacent tubes are disposed at positions crossing the positions of the line fasteners 13 installed at the other one of the adjacent tubes.

For example, the line fasteners 13 installed at the tube $T_1$ are disposed at positions 90°-crossing the positions of the line fasteners 13 installed at the tube $T_2$. Accordingly, it is possible to prevent the extension/retraction lines fastened to the line fasteners 13 of the adjacent tubes from interfering with each other.

Since upper rings 11 are mounted to respective upper ends of all tubes $T_1$ to $T_n$, and line fasteners 13 are mounted to the inside of each upper ring 11, the extraction/retraction lines fastened to the line fasteners 13 are also disposed inside the corresponding tube, so that they are not exposed to the outside of the tube.

The lower rings 12 are mounted to respective lower ends of the inner surfaces of the tubes. A plurality of bearings 2 are installed at each lower ring 12.

The bearings 2 function to guide the corresponding tube to extend or retract while moving straight in a vertical direction. Although the bearings 2 are installed only at the lower rings 12 in the illustrated case, they may also be installed at the upper rings 11. In this case, a plurality of bearings 2 are circumferentially installed along each ring 11 or 12. The bearings 2 installed at the lower ring 12 of each tube are arranged to be inwardly exposed to roll along an outer wall surface of another tube inwardly adjacent to the former tube. On the other hand, the bearings 2 installed at the upper ring 11 of each tube are arranged to be outwardly exposed to roll along an inner wall surface of another tube outwardly adjacent to the former tube.

The bearings 2 installed at the tubes as described above function as guides for guiding the tubes to extend or retract only in a longitudinal direction without rotating. The bearings 2, which have such a guide function, have the following structure.

That is, each bearing 2 includes a cylindrical roller 21.

As the bearing 2 is constituted by the cylindrical roller 21, the rotation direction of the roller 21 corresponds to the extension/retraction direction of the tubes.

It is preferred to adjust the frictional force between the roller 21 of the bearing 2 and the tube, which is in contact with the roller 21. A device for supporting the roller 21 is provided to adjust the frictional force between the roller 21 and the tube.

Figure 8:
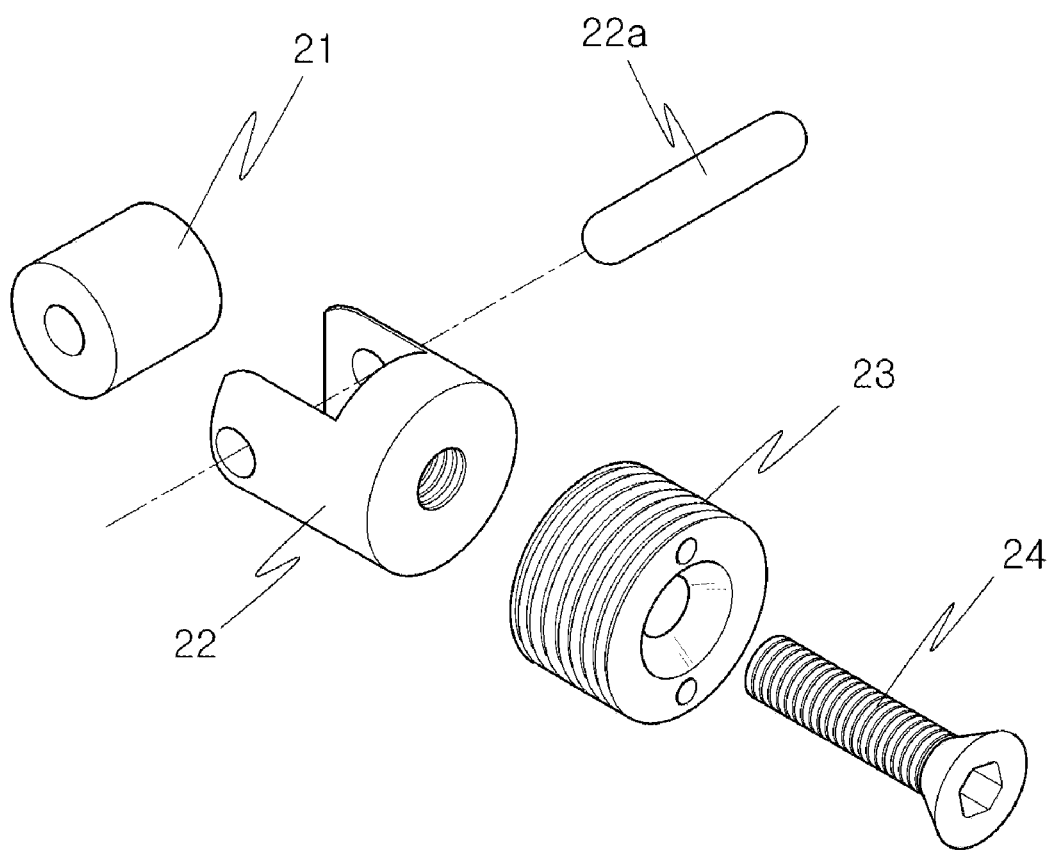
FIG. 8 is an exploded perspective view illustrating an example of a bearing included in the telescopic tube set according to the illustrated embodiment of the present invention.

As shown in FIG. 8, the roller support device includes a roller holder 22 for rotatably holding the roller 21 by a pin 22a, an adjuster 23 arranged outside the roller holder 22 in a bearing hole 121 formed at the lower ring 12, and a fastening bolt 24 fastened to the roller holder 22 through the adjuster 23 to vary the position of the roller holder 22 within the bearing hole 121 in accordance with the fastening degree of the fastening bolt 24.

Actually, the constituent element for fastening the bearing 2 to the lower ring 12 is the adjuster 23.

Figure 9:
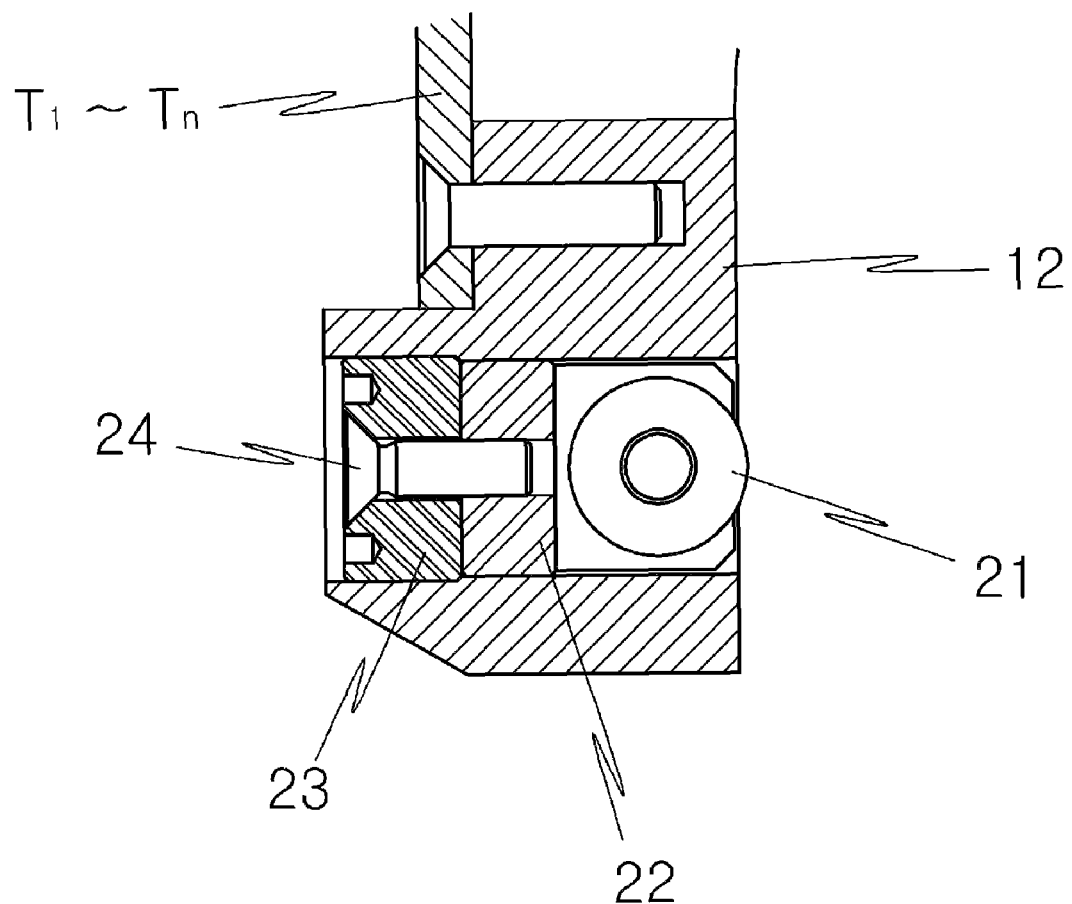
FIG. 9 is an enlarged sectional view illustrating an example of a bearing mounting device included in the telescopic tube set according to the illustrated embodiment of the present invention.
Figure 10:
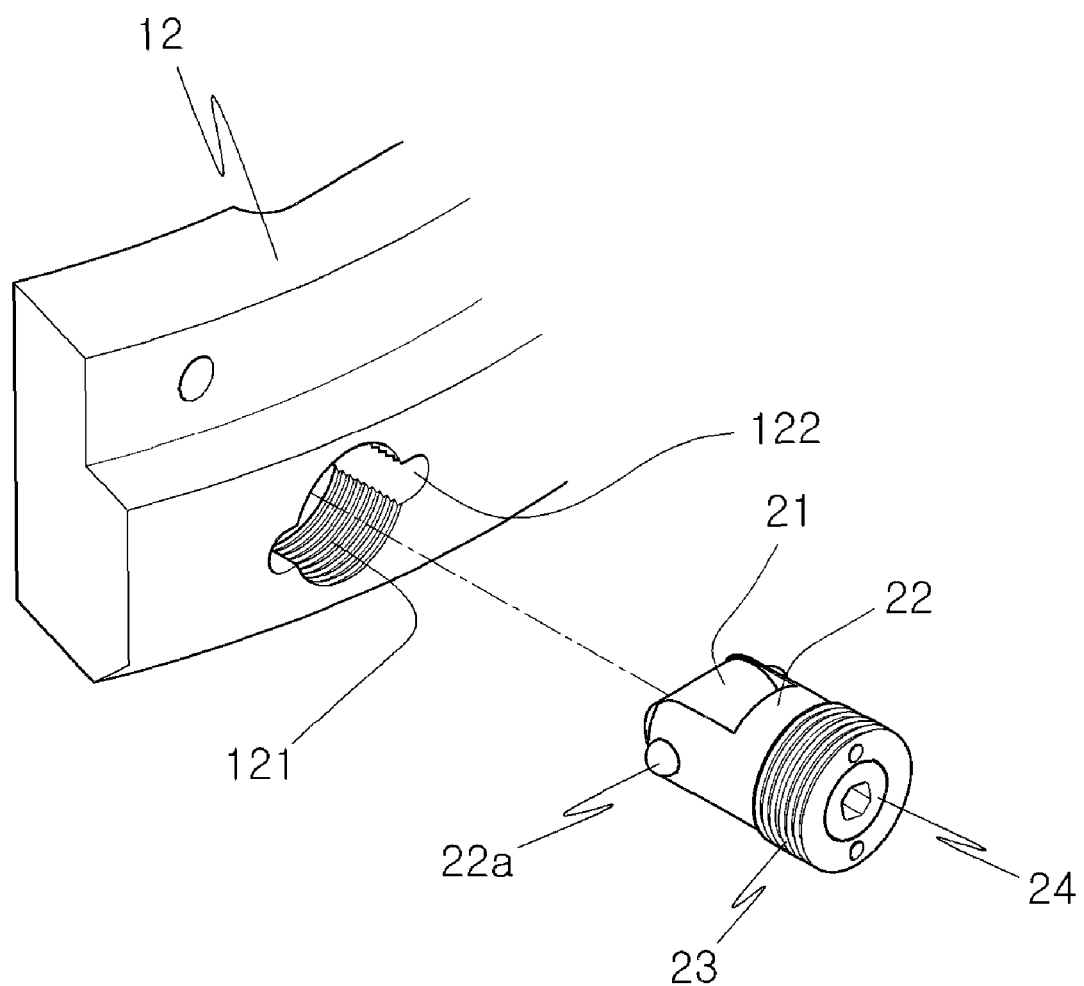
FIG. 10 is an enlarged perspective view illustrating a portion of a lower ring, at which the bearing is installed, in the telescopic tube set according to the illustrated embodiment of the present invention.

That is, as shown in FIGS. 9 and 10, the constituent element fastened to the bearing hole 121 formed at the lower ring 12 (or upper ring; The following description will be given only in conjunction with the lower ring.) is the adjuster 23. The roller holder 22 is coupled to the adjuster 23, which is installed at the lower ring 12, as the fastening bolt 24 is fastened to the roller holder 22 while extending through the adjuster 23.

When the adjuster is inserted into the bearing hole, if the fastening bolt is tightly fastened to the roller holder, the adjuster cannot be inserted rotationally due to frictional force. Thus, firstly the adjuster is inserted into the bearing hole in the condition of loosely fastening the fastening bolt to the roller holder, and then the fastening bolt is tightly fastened to the roller holder.

The adjuster 23 does not have a thread at an inner surface thereof, but has threads at an outer surface thereof. Accordingly, the adjuster 23 is threadedly coupled to the bearing hole 121. The fastening bolt 24 is fastened to the roller holder 22 while extending through a hole centrally formed at the adjuster 23. Thus, the roller holder 22 is coupled to the adjuster 23. The position of the adjuster 22 within the bearing hole 121 is adjusted in accordance with the fastening degree of the adjuster 23 to the threads of the hearing hole 121 obtained through rotation of the adjuster 23. In accordance with this adjustment, the distance between the roller 21 and the tube to come into contact with the roller 21 is adjusted.

In order to more easily fasten or unfasten the adjuster 23, a tool coupling groove is formed at an outer end of the adjuster 23.

When the adjuster 22 rotates in accordance with fastening or unfastening of the fastening bolt 24 upon adjusting the position of the roller 21, the rotation direction of the roller is varied from a vertical direction. When the rotation direction of the roller 21 is varied from the vertical direction, it may be misaligned from the extension/retraction direction of the tube. For this reason, it is necessary to prevent the rotation direction of the roller from being varied from the vertical direction. In order to prevent the rotation direction of the roller from being varied from the vertical direction, that is, to allow the roller holder 22 to move only in a horizontal direction without rotating, the pin 22a, which extends through the roller 21 to rotatably support the roller 21, is outwardly protruded from the roller 21 at opposite ends thereof, and pin grooves 122 are formed at opposite inner surface portions of the bearing hole 121 to receive the opposite ends of the pin 22a, respectively.

Accordingly, the roller holder 22 moves only in a horizontal direction without rotating during fastening or unfastening of the fastening bolt 24 because the opposite ends of the pin 22a are fitted in the pin grooves 122, respectively.

When the tubes $T_2$ to $T_n$ retract with respect to the fixed outermost tube $T_1$, the upper rings 11 may function as stoppers, as shown in FIG. 4. Also, when the tubes $T_2$ to $T_n$ extend with respect to the fixed outermost tube $T_1$, the lower rings 12 may function as stoppers. Accordingly, the extension/retraction range of the tubes may be limited. However, when the tubes are unintentionally extended due to damage of the pulling wire or other factors, the weights of the tubes may be applied to the lower rings 12, so that the tubes may be damaged.

In order to reduce such a phenomenon, stoppers 14 are installed at respective lower ends of the inner wall surfaces of a part of the tubes $T_1$ to $T_n$, for example, the tubes $T_1$ to $T_{n-1}$, to limit extension of the tubes. Each stopper 14 may have a cylindrical ring shape.

Line holes 15 may be vertically formed through each of the upper and lower rings 11 and 12.

If the diameter of each extension/retraction line is too large, or the gap defined between the upper or lower ring 11 or 12 and the inner or outer surface of the tube facing the upper or lower ring 11 or 12 is too narrow, the extension/retraction line cannot be easily installed, or cannot smoothly operate. This problem may be eliminated by provision of the line holes 15, through which the extension/retraction lines extend, respectively.

In addition, an axial key may be installed at the inner surface of each tube in the telescopic tube set in accordance with an exemplary embodiment of the present invention. Although it may be possible to allow the tubes to move straight, using the roller-shaped bearings, as described above, an axial key and an axial key groove may be formed at facing surfaces of the adjacent tubes, in order to achieve more accurate extension and retraction of the tubes.

Since the telescopic tube set having the above-described configuration according to the illustrated embodiment of the present invention has a complex arrangement, it is preferred that assembly of the telescopic tube set be carried out through an optimal assembly method.

Of course, assembly of the telescopic tube set may be achieved through various methods. However, the following method is a most general method.

First, the stoppers 14 are installed at respective inner surfaces of a part of the tubes $T_1$ to $T_n$, namely, the tubes $T_1$ to $T_{n-1}$. Thereafter, the pulleys $P_1$ to $P_{n-2}$ are mounted to respective lower ends of the inner surfaces of the tubes $T_2$ to $T_{n-1}$. Also, the lower rings 12 having the bearings 2 are mounted to respective lower ends of the tubes $T_1$ to $T_{n-1}$.

Subsequently, the tubes $T_1$ to $T_n$, at which a part of the constituent elements of the telescopic tube set are installed, are assembled. Thus, assembly of the telescopic tube set is completed. The assembly of the tubes $T_1$ to $T_n$ is carried out in the order from the tube having a smallest diameter toward the tubes having larger diameters. Once the assembly is completed, the adjuster 23 of each bearing 2 is moved in an extension or retraction direction, to adjust the gap between the roller 21 and the tube to come into contact with the roller 21.

Although the telescopic tube set according to the illustrated embodiment of the present invention includes 3 to 6 tubes, an increased number of tubes may be used.

As apparent from the above description, in accordance with the present invention, it may be possible to provide a telescopic tube set having excellent strength against bending and torsion because the tubes of the telescopic tube set have a cylindrical shape.

In accordance with the present invention, the tubes of the telescopic tube set extend or retract by the same length during extension or retraction of the telescopic tube set. Accordingly, more stable operation can be achieved.

In addition, it may be possible to prevent malfunction of the telescopic tube set caused by contamination of extension/retraction lines connected between adjacent tubes and a tube extension/retraction device through a configuration in which the extension/retraction lines and extension/retraction device are not exposed to the outside of the telescopic tube set even when the telescopic tube set extends to a maximum length. It may also be possible to prevent a person or other equipment from being injured or damaged by the extension/retraction lines or extension/retraction device.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A telescopic tube set for a bridge transport system, comprising:
    cylindrical tubes each having an upper end, at which an upper ring is mounted, and a lower end, at which a lower ring is mounted, the cylindrical tubes having different diameters;
    pulleys mounted to respective inner wall surfaces of a part of the tubes; and
    extension/retraction lines each having an end connected to the upper ring of a corresponding one of the tubes, and an opposite end connected to the upper ring of another corresponding one of the tubes while extending around the pulley mounted to the tube interposed between the corresponding tubes,
    wherein a plurality of bearings are installed at the lower ring to guide the tube, at which the lower ring is mounted, such that the tube extends or retracts straight in a longitudinal direction.

2. The telescopic tube set according to claim 1, further comprising:
    line fasteners for connecting each of the extension/retraction lines to the upper ring of each of the corresponding tubes,
    wherein each of the line fasteners is a tension bolt.

3. The telescopic tube set according to claim 1, wherein each of the extension/retraction lines is a wire.

4. The telescopic tube set according to claim 1, wherein each of the extension/retraction lines is a chain, and each of the pulleys is a sprocket.

5. The telescopic tube set according to claim 1, wherein each of the bearings comprises:
    a cylindrical roller;
    a roller holder for rotatably holding the roller by a pin, and slidably received in a bearing hole formed at the lower ring;
    an adjuster coupled to the bearing hole and arranged outside the roller holder in the bearing hole, to vary a position of the roller holder within the bearing hole in accordance with a fastening degree of the adjuster; and
    a fastening bolt fastened to the roller holder while extending through the adjuster, to fasten the adjuster to the roller holder.

6. The telescopic tube set according to claim 5, wherein pin grooves are formed at opposite inner surface portions of the bearing hole to receive opposite ends of the pin, respectively.

7. The telescopic tube set according to claim 1, wherein a plurality of bearings are installed at the upper ring, and the bearings of the upper ring have the same structure as the bearings of the lower ring.

8. The telescopic tube set according to claim 7, further comprising:
   stoppers installed at respective lower ends of the inner wall surfaces of a part of the tubes, to limit extension of the tubes.

9. The telescopic tube set according to claim 8, wherein each of the stoppers has a cylindrical ring shape.

10. The telescopic tube set according to claim 1, wherein line holes are vertically formed through each of the upper and lower rings.

* * * * *